United States Patent
Stabb et al.

(10) Patent No.: US 7,159,188 B2
(45) Date of Patent: Jan. 2, 2007

(54) SYSTEM AND METHOD FOR NAVIGATING CONTENT IN AN ITEM

(75) Inventors: Charles W. Stabb, Seattle, WA (US); Gerald P. Shea, Duvall, WA (US); Joshua Alexander Dersch, Redmond, WA (US); Alan L. Marks, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 10/691,887

(22) Filed: Oct. 23, 2003

(65) Prior Publication Data

US 2005/0091612 A1 Apr. 28, 2005

(51) Int. Cl.
*G06F 3/00* (2006.01)

(52) U.S. Cl. ............... 715/787; 715/786; 715/838; 715/973

(58) Field of Classification Search ............... 715/787, 715/784, 786, 808, 838, 856, 711, 973
See application file for complete search history.

(56) References Cited

U.S. PATENT DOCUMENTS

| | | | |
|---|---|---|---|
| 5,680,561 A * | 10/1997 | Amro et al. ............... 715/787 |
| 5,838,320 A * | 11/1998 | Matthews III et al. ...... 715/786 |
| 6,026,416 A | 2/2000 | Kanerva et al. |
| 6,275,829 B1 | 8/2001 | Angiulo et al. |
| 6,496,206 B1 * | 12/2002 | Mernyk et al. ............. 715/835 |
| 6,621,590 B1 * | 9/2003 | Livingston ................. 358/1.15 |
| 6,667,751 B1 * | 12/2003 | Wynn et al. ................ 715/833 |
| 6,816,174 B1 * | 11/2004 | Wu et al. ................... 715/787 |
| 6,864,904 B1 * | 3/2005 | Ran et al. .................. 715/760 |
| 2002/0149612 A1 * | 10/2002 | Malamud et al. ........... 345/711 |
| 2002/0163545 A1 * | 11/2002 | Hii ............................. 345/838 |
| 2002/0186252 A1 * | 12/2002 | Himmel et al. ............. 345/787 |
| 2003/0009469 A1 | 1/2003 | Platt et al. |
| 2003/0014415 A1 * | 1/2003 | Weiss et al. ................. 707/10 |
| 2003/0028850 A1 | 2/2003 | Quinn et al. |
| 2003/0076322 A1 | 4/2003 | Ouzts et al. |
| 2004/0003351 A1 * | 1/2004 | Sommerer et al. ......... 715/517 |
| 2004/0085364 A1 * | 5/2004 | Keely et al. ................ 345/804 |
| 2004/0090462 A1 * | 5/2004 | Graham ..................... 345/767 |
| 2004/0205514 A1 * | 10/2004 | Sommerer et al. ....... 715/501.1 |
| 2004/0205633 A1 * | 10/2004 | Martinez et al. ............ 715/526 |
| 2004/0267700 A1 * | 12/2004 | Dumais et al. ............... 707/2 |
| 2005/0235203 A1 * | 10/2005 | Undasan .................... 715/526 |

* cited by examiner

*Primary Examiner*—Sy D. Luu
(74) *Attorney, Agent, or Firm*—Shook, Hardy & Bacon, L.L.P.

(57) ABSTRACT

A system and a method for a user interface which generates a preview display to aid in the navigation of items of content on a computer. A screen displays an item to a user. Upon receipt of a user input representing a proposed navigational action to be performed with respect to the item, a preview display is generated and rendered on the screen display. The preview display includes at least a portion of the display which would result from a selection to perform the navigational action with respect to the item.

34 Claims, 10 Drawing Sheets

SYSTEM AND METHOD FOR NAVIGATING CONTENT IN AN ITEM

CROSS-REFERENCE TO RELATED APPLICATIONS

This application is related by subject matter to the invention disclosed in the commonly assigned application U.S. Application Ser. No. 10/691,889, filed on even date herewith, entitled "Shell Browser Preview Display."

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to a system and a method for providing an improved user interface that allows a user to navigate content by providing a preview display in response to a user input.

BACKGROUND OF THE INVENTION

Providing computer users with useful and understandable controls for navigating information presented upon a computer display has become increasingly important as the amount of information stored in computing environments has grown. In recent years, computers have become able to handle larger and larger files, and the type of stored information has diversified to include pictures, music, documents, and other media.

With such an increase in complexity, a problem frequently experienced by computer users is the inability to quickly locate desired subject matter. When a user is looking for a specific piece of content, the ability to efficiently view information not currently shown on the screen can greatly assist in navigation of content on a computer.

For example, a user may experience difficulties locating a particular file on a computer. A typical method to organize computer files is in a hierarchical fashion with the files stored within folders. File system browsers, also known as shell browsers, enable users to navigate through the file system and locate and open files and folders. For example, Microsoft Corporation's WINDOWS® EXPLORER™ is an operating system utility which enables users to browse the file system.

Many users find it difficult to correctly identify a file based on the information currently available in conventional file system browsers. Of course the contents of a file can be verified by opening it with an application program, but this method of browsing files is extremely inefficient. The ability to view information about the content contained in a file can greatly assist a user in identifying information about a particular file without having to open it.

Conventional file system browsers, however, do not allow users to preview the content of a file without actually opening the file. To date, the ability of users to preview content has been limited to special purpose software applications. For example, Microsoft Corporation's WINDOWS® XP™ operating system includes an image browser for use in the My Pictures folder. The My-Pictures folder utilizes software that enables users to view pictures as photos, not just as document icons. My Picture's image browsing features include the ability to view thumbnail-size and large versions of photos, rotate photos that are sideways, and create a slide show. The preview control area in the My Picture's folder contains an enlarged preview image of a user-selected image, iterator buttons to assist a user in iterating through a series of pictures and controls for rotating pictures in a clockwise or counterclockwise direction. The image browsing features may also be enabled in other folders by selecting to display a thumbnail view of a file instead of an icon. This functionality may be applied, for example, to certain word processing and presentation files, as well as to graphics files. However, such a thumbnail view simply renders a preset graphical image which has been associated with a file. While the image browsing features in WINDOWS® XP™ have advanced the state of the art by alleviating the need to invoke a separate application program to view graphical images, such functionality is limited to displaying preset images associated with files.

Another area of interest is navigation through documents which are displayed on a computer screen. As the ability of computers to handle such information increases, the amount and type of information that can be presented in a single document has also grown. To facilitate navigation of these documents, various software applications include enhanced navigational tools. For example, in Microsoft Corporation's PowerPoint™ 2002 presentation program, a user may choose to display a thumbnail view of the various slides in one pane, while an adjacent pane displays one slide at a time. A user may scroll through the thumbnail pane to find desired information and, by clicking a mouse button on the preferred thumbnail, can cause that slide to become viewable in the adjacent pane. While this thumbnail view is useful to locate a slide with a certain piece of information, this view simply displays the entire set of content while decreasing the space available to view the slides individually.

Another example of enhanced navigational functionality is found in Microsoft Corporation's Word™ 2002 word processing program. When utilizing the scrollbar in Word™ to navigate in a document, clicking a mouse button over the indicator box in the scrollbar causes a text box displaying the current page number and heading information to be displayed. As the indicator box is dragged, the information within the text box is updated to reflect the current position and heading information. While this scrollbar functionality improves navigation, a user must commit to navigation away from currently displayed information to alter the text box information and, furthermore, the page and heading information is not a preview in that it relates only to the currently displayed document segment.

Accordingly, there is a need for an improved user interface which enables a user navigating within an item of content to see a preview of the information that would be displayed if a proposed navigational action were performed. There is further a need for a method that allows users to preview a proposed navigational action to be performed with respect to an item of content.

SUMMARY OF THE INVENTION

The present invention meets the above needs and overcomes one or more deficiencies in the prior art by providing a user interface which is configured to render a preview display in response to a user input. In one aspect of the present invention, a graphical user interface is provided which includes a primary display area and a preview display area. The preview display area is rendered in response to a user input representing a selection to preview a proposed navigational action to be performed with respect to an item displayed in the primary display area. The preview display area includes at least a portion of the content which would be shown in the primary display area in response to a selection to perform the proposed navigational action.

Another aspect of the present invention includes a computer-implemented method for enabling a preview display during navigation. The method includes displaying an item, receiving a user input representing a proposed navigational action to be performed with respect to the item, and rendering a preview display upon a screen. The preview display includes at least a portion of the content which would be rendered in response to a selection to perform the proposed navigational action.

In a further aspect of the present invention, a navigation control for enabling a preview display is provided. This control includes a user input component for obtaining an indication of a proposed navigational action, a navigational analysis component for assessing the result of performance of the proposed navigational action and a preview generation component for generating a preview image. The preview image is utilized by an output component to render the image on a screen area.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides an improved user interface that allows for the navigation of content by providing a preview display in response to a user input. An exemplary operating environment for the present invention is described below.

Figure 1:
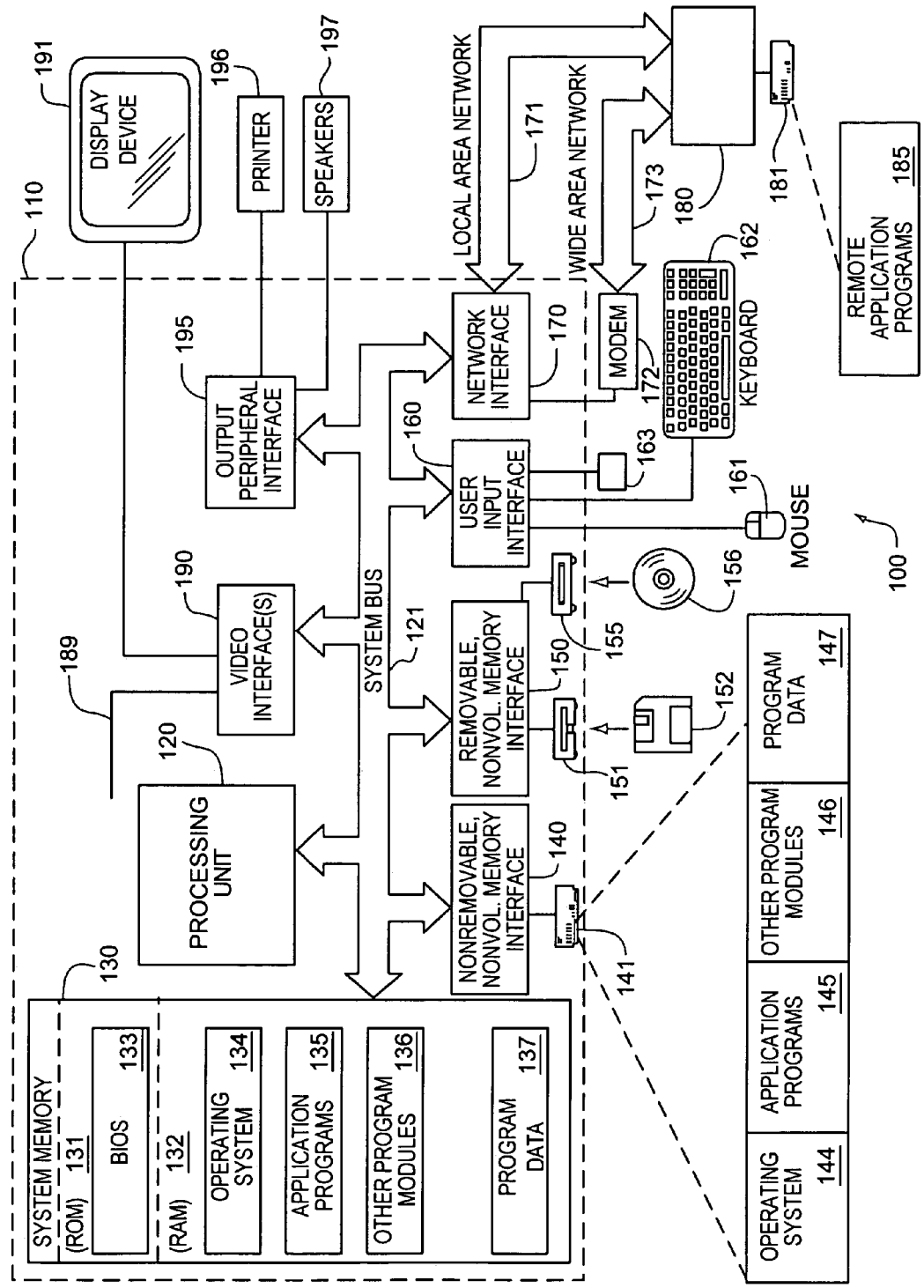
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/non-removable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, EEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2A:
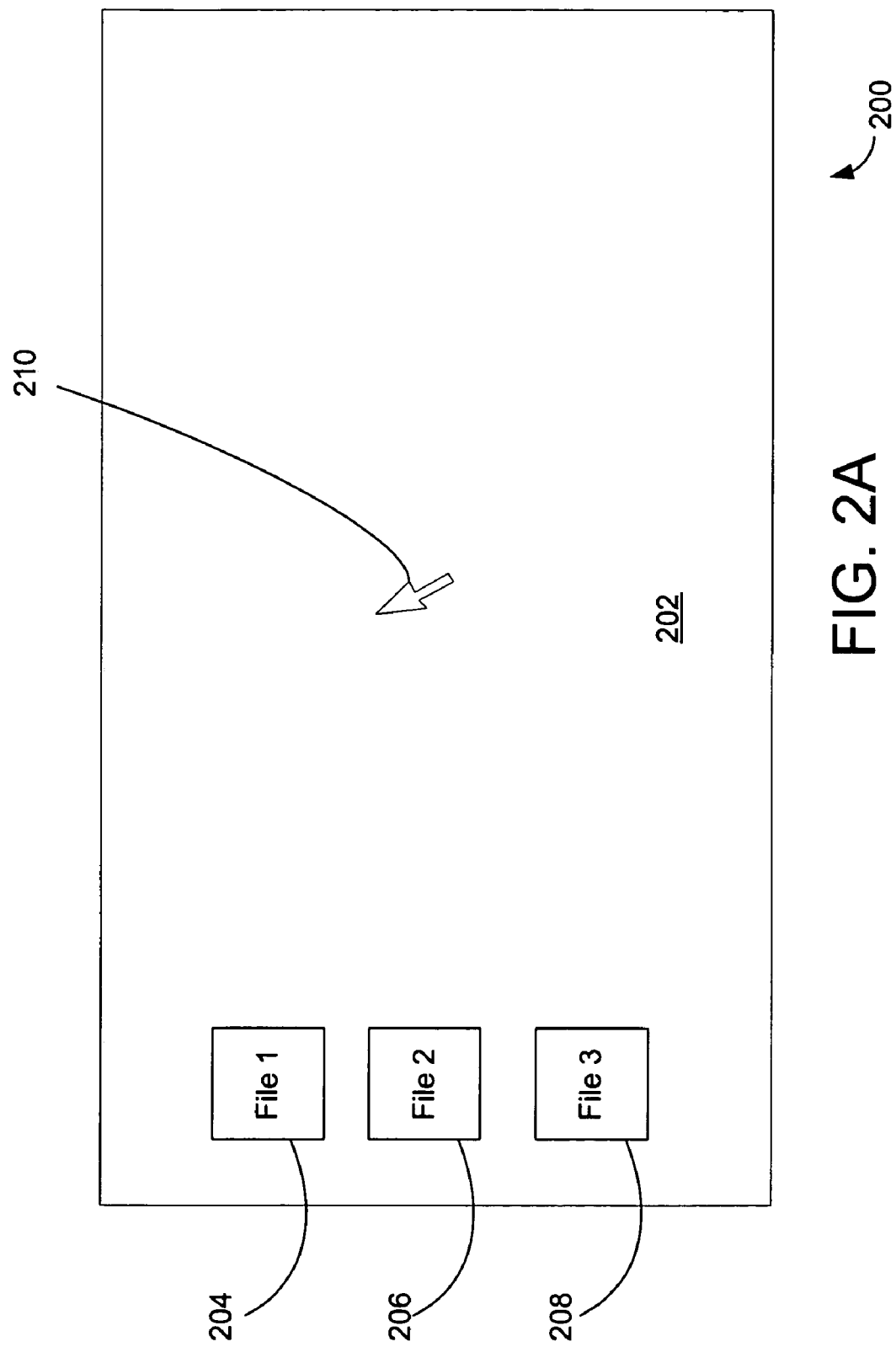
FIGS. 2A–2B are screen displays of an exemplary graphical user interface in accordance with one embodiment of the present invention in which a preview display is utilized with a shell browser.

In FIG. 2A, a screen display 200 provides an exemplary screen view in accordance with one embodiment of the present invention. Such a view may be displayed on a variety of display devices and represents a view that may be displayed to a user. For example, the screen display 200 may be associated with a user interface for navigation of files on a computer. Such an interface may be presented by a shell browser or a file system browser. The terms "shell browser" and "file system browser" are used interchangeably herein to refer to a browser which allows a user to navigation through various namespaces including files and other non-file items. The screen display 200 may include one or more of display areas or panes. FIG. 2A shows one such display area, display area 202.

The display area 202 displays items 204, 206 and 208. Those of ordinary skill in the art will recognize that the items 204, 206 and 208 may be associated with specific sets of data, such as computer files or non-file objects. Those skilled in the art will further recognize that a shell viewer may display graphics such as icons, links or bookmarks in the presentation of items 204, 206 and 208 to a user. As shown in the FIG. 2A; the items 204, 206, and 208 are associated with File 1, File 2 and File 3 respectively. For example, the items 204, 206 and 208 may be associated with word processing document files, spreadsheets, presentation document files, or databases. The items may be associated with non-file objects. Examples of non-file objects may include, but would not be limited to contacts, favorites and email messages. The items 204, 206 and 208 may be associated with data on a local computer or data on a remote computer including web pages. The remotely stored data may be accessible over a network, an intranet or the Internet.

The display area 202 also shows a mouse pointer 210. The mouse pointer 210 is operably coupled to a mouse device which allows a user to alter the position of the mouse pointer 210 and to input commands. The screen area 202 is capable of receiving inputs from the user which cause the mouse pointer 210 to change positions and for the user to input other navigational commands. Those skilled in the art will recognize that a wide variety of input devices are suitable for the present invention and that utilization of a mouse pointer on a display area is not necessary to practice this invention. For example, devices such as a keyboard or a screen with user input capacity such as touch-screens and screens capable of receiving stylus inputs are also acceptable for use with the present invention.

Figure 2B:
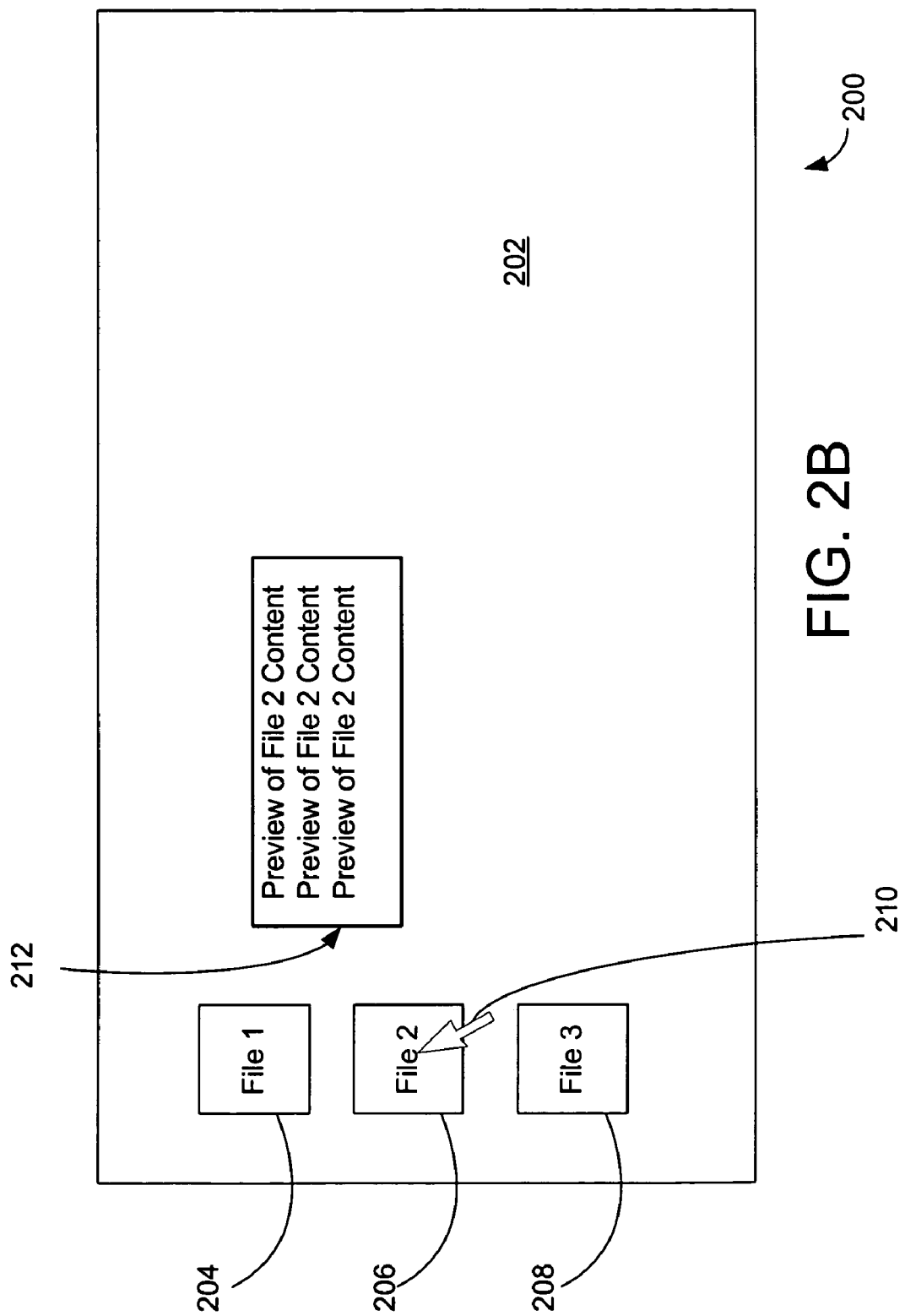

Turning to FIG. 2B, the screen display 200 presents an exemplary view of the screen area 202 resulting from a user input representing a selection to preview the contents of File 2. In this example, the user input is communicated via user interaction with a mouse causing the mouse pointer 210 to be placed over the item 206 for a predetermined period of time. The placement of a mouse pointer over an item is often referred to as hovering. Those skilled in the art will recognize that this invention may utilize user inputs communicated in a variety of ways and via a variety of input devices. Another exemplary input method acceptable for use with this invention is to single click a button of a mouse while a mouse pointer is hovering over an item for which a preview is desired.

A preview display 212 is rendered within the screen area 202 in response to the user input representing a selection to preview the contents of File 2. In one embodiment, the preview display 212 is viewable in a display pane which displays only the preview display 212, and the display pane is rendered in response to the user input; however, a preview display need not be positioned in such an independent pane. For example, a preview display may be rendered in a pane which is already viewable to a user and/or which displays other content to the user.

The preview display 212 presents to the user at least a portion of the display which would result as a response to a user input requesting to view the contents of an item. For example, if File 2 were a word processing document file, a user input requesting to view File 2 would result in the opening of a word processing application which would present at least a portion of that document. Accordingly, the preview display 212 would also present at least a portion of the document. As another example, if File 2 were a presentation file, a user input requesting to view File 2 would result in the opening of a presentation application, such as Microsoft Corporation's PowerPoint™, which would present at least a portion of a slide in that presentation. Accordingly, the preview display 212 would also present at least a portion of a slide of that presentation. Those skilled in the art will recognize that a wide variety of items such as spreadsheets, web pages, databases and emails may be previewed according to this invention.

In order to generate the preview display 212, data associated with the selected item, e.g. File 2, is utilized. In one embodiment, the generation of the preview display 212 is accomplished via utilization of the same set of data which would be used by an application to open File 2. Because a user may wish to preview a variety of content, the preview display includes functionality to interpret data from a variety of file types and to create preview displays for each type. Those skilled in the art will recognize that such functionality is made possible by a utility coupled with the user interface which is able to decipher the file data and create a display associated with the data. Such a utility is able to read the data either via access to a local data store or over a network connection and is further able to determine the format of the file data. The utility is able to analyze the data in a manner similar to an application which can open the object or an application which can provide a user interface with the object. For example, if File 2 were in a word processing file format, the file viewer utility is able to recognize that format, and, by interpreting the data in a manner similar to a word processing application, can generate a preview display. This may be accomplished by rendering the document in place at a lower zoom factor. For example, a page of a document may be rendered at a smaller zoom factor to fit in the space provided for the preview display. As another example, a portion of a page may be chosen for rendering in the preview display space.

The utility is further operable to decide which content from the file should be placed in the preview display. In one embodiment of the present invention, a document file may be previewed by displaying a portion of the first page of the document. However more sophisticated content selection algorithms may be employed to provide a richer user experience. For example, the content selection rules may include the functionality to consider characteristics of document text. White space may be disregarded, while text with certain heading properties may be selected. Such content may be pulled from different parts of the document to provide the most useful preview display. Those skilled in the art will recognize that a preview utilizing this selection algorithm may resemble a table of contents. In the case of database and spreadsheet files, the content selection algorithm may, for example, endeavor to present field titles or column headings. In the case of emails, information such as the name of the sender, the subject line, and the date sent may be selected for the preview display. Those skilled in that art will recognize that any number of content selection algorithms may be utilized with the present invention and the a user may be given the opportunity to control some of the selection choices depending on the type of data being previewed.

Once the preview display 212 is rendered, the preview may aid a user in their further navigational decisions. One embodiment of the present invention allows a user to input navigational commands upon the screen area consumed by a preview display. For example, a user may move the mouse pointer 210 on to the preview display 212 and click a mouse button. Such an input may cause the content of File 2 to be displayed on the screen by launching an application. For example, if File 2 were a word processing document file, a word processing application will launch and display the contents of File 2.

Alternatively, an input may alter the content displayed in the preview display 212. For example, a user may be able to zoom in on the displayed content or be able to view file content not currently being displayed in the preview display 212.

A user, after viewing the preview display 212, may choose not to perform further navigational actions with respect to File 2, the previewed file. In this case, the preview display 212 may be removed from the screen area 202. According to one embodiment, certain subsequent user inputs dictate such removal. For example, in an embodiment of the present invention in which hovering the mouse pointer 210 over the item 206 leads to rendering the preview display 212, a user may move the mouse pointer 210 away from the item 206 and away from the preview display 212. Such movement will cause the preview display 212 to be hidden and will return screen display 200 to a state resembling screen display 200 in FIG. 2A. Those skilled in the art will recognize that a variety of subsequent user inputs may cause the preview display 212 to be hidden. As another example, a preview display may be presented with a close button which, when selected with a mouse, causes the preview display to be hidden. The preview display may also be configured to close after a predetermined period of time. Certain embodiments of the present invention may allow multiple preview displays to remain viewable to a user at the same time.

Figure 3:
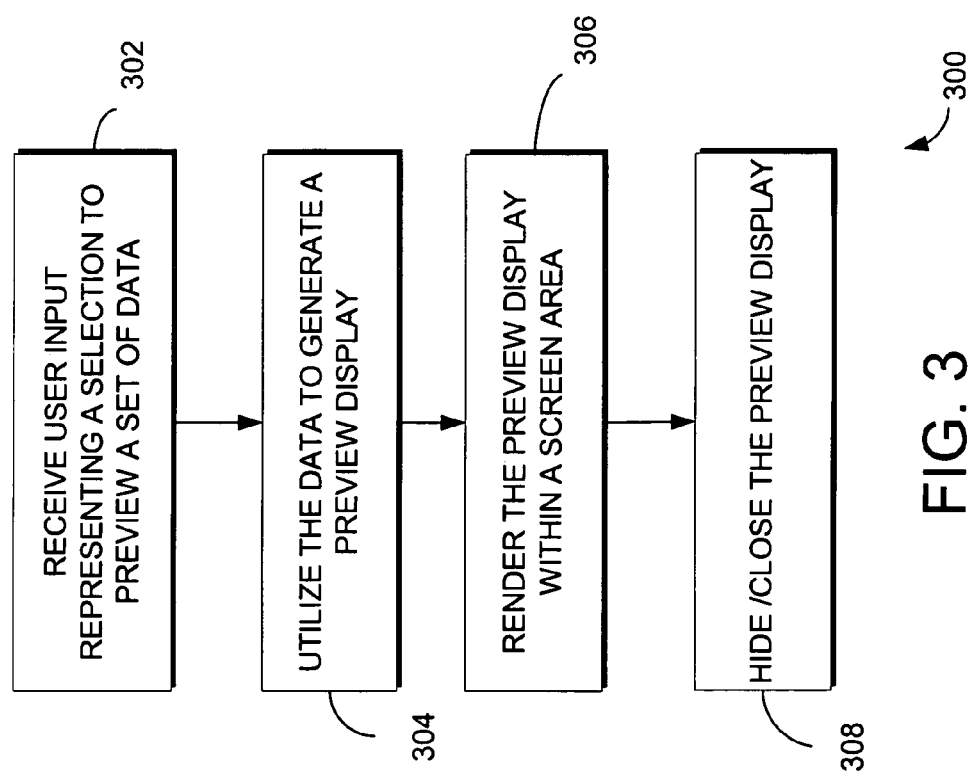
FIG. 3 is a flow diagram showing a method for providing a preview display in accordance with the embodiment of the present invention shown in FIGS. 2A and 2B.

FIG. 3 is a flow diagram illustrating a method 300 for navigating content presented in a graphical user interface. At 302, the method 300 receives a user input representing a selection to preview a set of data. Those skilled in the art will recognize that this input may be communicated via a variety of input devices and that the set of data may be of a variety of computer items such as media or document files and non-file objects. For example word processing documents, presentation documents, spreadsheets, databases and emails are contemplated by the present invention. The set of data may reside on a local computer or on a remote data store which is accessible over a network, an intranet, or the Internet.

At 304, the method 300 utilizes the set of data to create a preview display. In one embodiment, a subset of the data is utilized in a manner substantially similar to the manner used by an application to open a file associated with the set of data or to provide a user interface for interaction with the set of data. Those skilled in the art will recognize from the foregoing that the utilized data is not metadata or a static thumbnail in electronic picture format, but the actual underlying file data itself. The utilization of this data may include determining the data format, and then deciphering the data in a manner similar to an application capable of providing a user interface for interaction with the set of data. As described above, this may be accomplished by rendering the document in place at a lower zoom factor. For instance, a portion of a page of a document may be rendered at a smaller zoom factor to fit in the space provided for the preview display.

To generate the preview display, the method step 304 also may optionally include a content selection algorithm. Such an algorithm is configured to determine which content associated with the set of data being previewed should be provided in the preview display. For example, the content selection algorithm may be configured to present only title or heading information to a user. While the user may be given flexibility in determining the nature of the content selections rules, an objective of the algorithm is to present content that is useful to a user in making further navigational choices.

At 306, the method 300 renders the preview display within a screen area. In one embodiment of the present invention, the preview display is presented in a separate display pane which primarily shows only the preview display. However, the preview display may be placed anywhere within the screen area.

At 308, an optional step of hiding or closing the preview display is performed. Those skilled in the art will recognize that certain, subsequent user inputs may dictate such removal and the a variety of subsequent user inputs are acceptable. Such a subsequent input may be a request to perform some action upon the previewed set of data or to discontinue the rendering of the preview display. Other embodiments of the present invention may hide the preview display after a predetermined time period.

Figure 4:
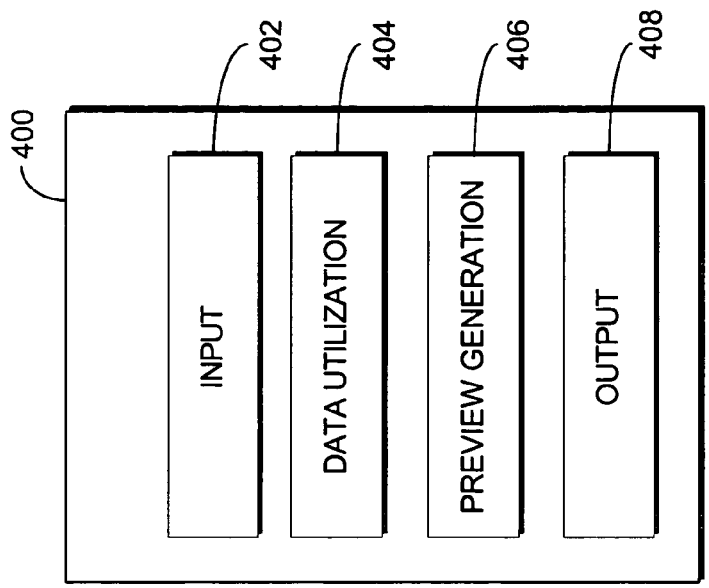
FIG. 4 is a block diagram of a navigation control in accordance with the embodiment of the present invention shown in FIGS. 2A and 2B.

In FIG. 4 a block diagram of a navigation control 400 in accordance with the present invention is shown. The navigation control 400 has a user input component 402 for obtaining data indicating a user input representing a request to preview a set of data. Such input may be via one or more of a variety of input devices known to those of ordinary skill in the art.

The navigation control 400 also comprises a data utilization component 404. This component is configured to access the set of data being previewed and, by deciphering the data in a manner similar to an application capable of providing a user interface for interaction with the set of data, is able to determine the content associated with the data set which is available for presentation to a user. For example, if the set of data were associated with a word processing document, the data utilization component would determine the text of the document in manner similar to that of a word processing application. Those skilled in the art will recognize that the data utilization component 404 may be configured to analyze a variety of data formats.

The navigation control 400 further comprises a preview generation component 406 which is configured to select content associated with the data set to show in the preview display. Such selection may be to simply display the first page of a document or may rely on more complicated content selection rules. An output component 408 is also included in the navigation control 400. Such graphical components are well known in the art, and the output component 408 generates instructions for rendering the selected content within a preview display.

Figure 5:
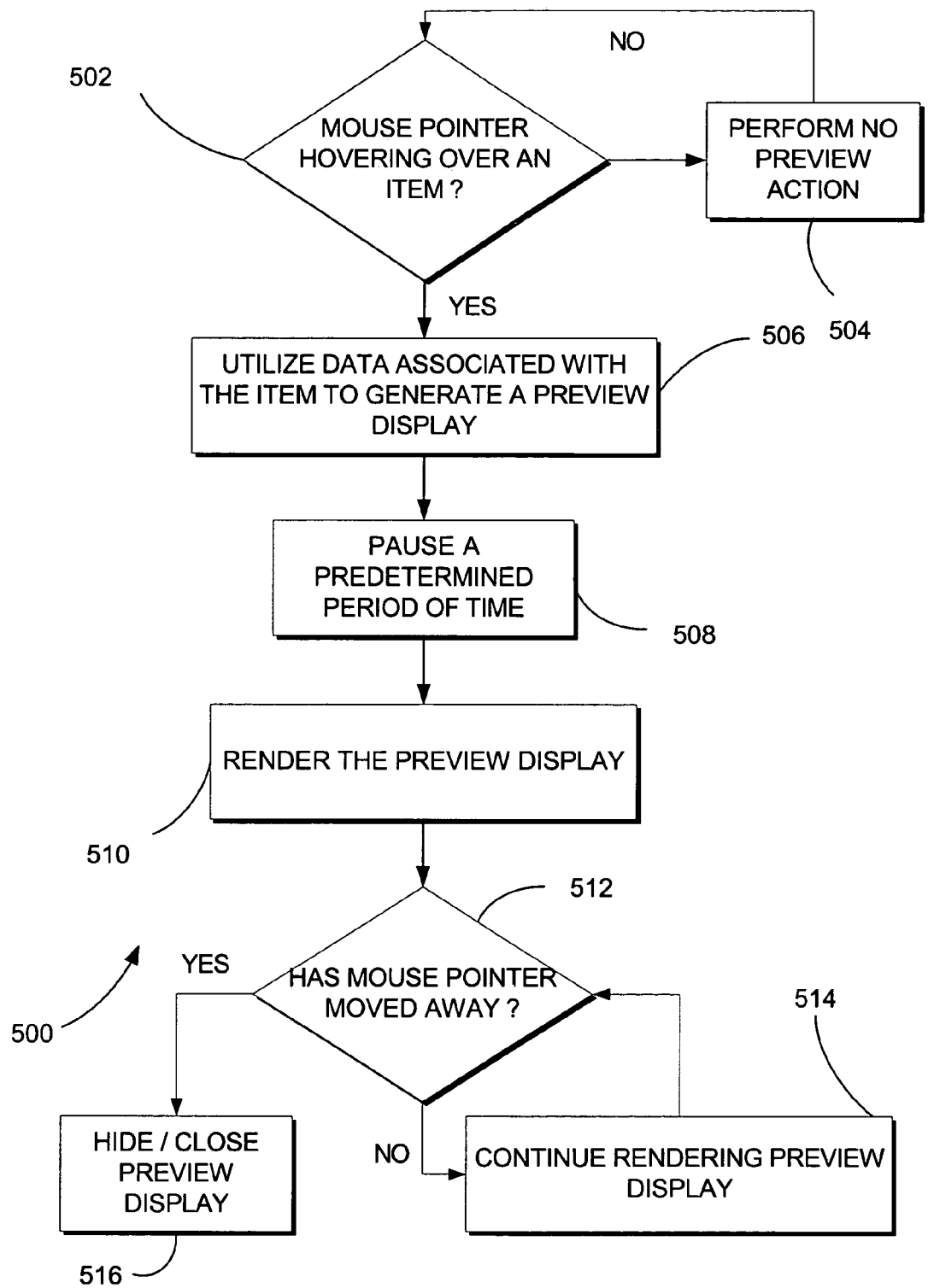
FIG. 5 is a flow diagram showing a method for providing a preview display in accordance with the embodiment of the present invention shown in FIGS. 2A and 2B.

FIG. 5 is a flow diagram illustrating another method 500 for providing a preview display in accordance with the present invention. At 502, the method 500 determines whether a mouse pointer is hovering over an item. If no such hovering is detected, no preview action is performed as indicated at 504. If the mouse is hovering over an item, at 506, the method 500 utilizes data associated with the item to generate a preview display. As discussed previously, this utilization of data may include determining the data format, and then deciphering the data in a manner similar to an application capable of providing a user interface for interaction with the set of data. A set of content associated with the utilized data is selected for inclusion within a preview display.

At 508, the method 500 pauses for a predetermined period of time. Following the pause, at 510, the preview content is rendered in a preview display. This pause is an optional step included to reduce instances of undesired preview displays.

At 512, the method 500 determines whether the mouse position has moved away from the item or the preview display. If not, at 514, the method 500 continues to render the preview display. If the position has changed, the preview display is hidden or closed at 516.

Figure 6A:
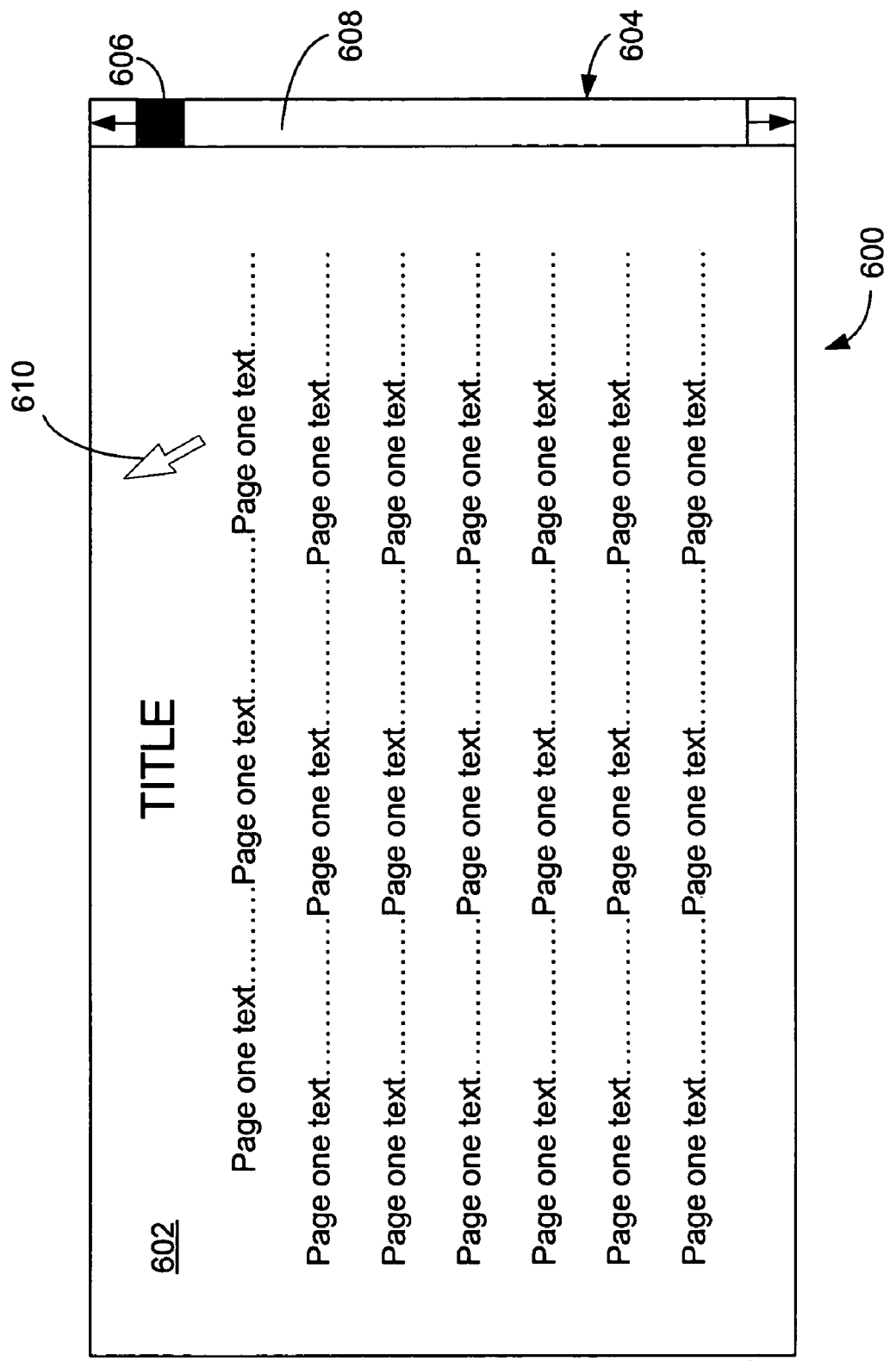
FIGS. 6A–6C are screen displays of an exemplary graphical user interface in accordance with one embodiment of the present invention in which a preview display is utilized within a file.

Turning to FIG. 6A, a screen display 600 provides an exemplary screen view in accordance with another embodiment of the present invention. A screen area 602 displays a set of content associated with an item to the user. Such an item may be a computer file and the screen area 602 may be associated with an application that is operable to display the contents of the computer file. For example, if the computer file were a word processing document, the screen area 602 may be associated with a word processing application. As a further example, if the computer file were a web page, a web browser may present the screen area 602. Those skilled in the art will recognize that the screen area 602 may be associated with a wide variety of applications that are operable to display a variety of items.

Screen display 600 also includes a scrollbar 604. The scrollbar 604 comprises a scrollbar column 608 and a scroll indicator 606. Such scrollbars are widely known in the art. Content is moved into or out of the screen area 602 by displacement of the scroll indicator 606 within the column 608. Those skilled in the art will also recognize that each position within the scroll column 608 is associated with the set of content that would be displayed in the screen area 602 if the scroll indicator 606 were moved to that position within the scroll column 608.

A user may input navigational commands through interaction with the scrollbar 604. Such interaction may be via a variety of input devices including a mouse, a keyboard and a screen with user input capability. When a mouse is utilized, a mouse pointer 610 may assist a user in such interaction. Those skilled in the art will appreciate that the scrollbar 604 is a visual aid which assists a user in the navigation of content. While a navigation region is contemplated, a scrollbar is not necessary to practice the instant invention. If a scrollbar is utilized, a variety of types of scrollbars may be utilized with the present invention. For example, a paginated document may have a scrollbar that, within the scroll indicator, presents the document page number of the document page that is currently being displayed.

Figure 6B:
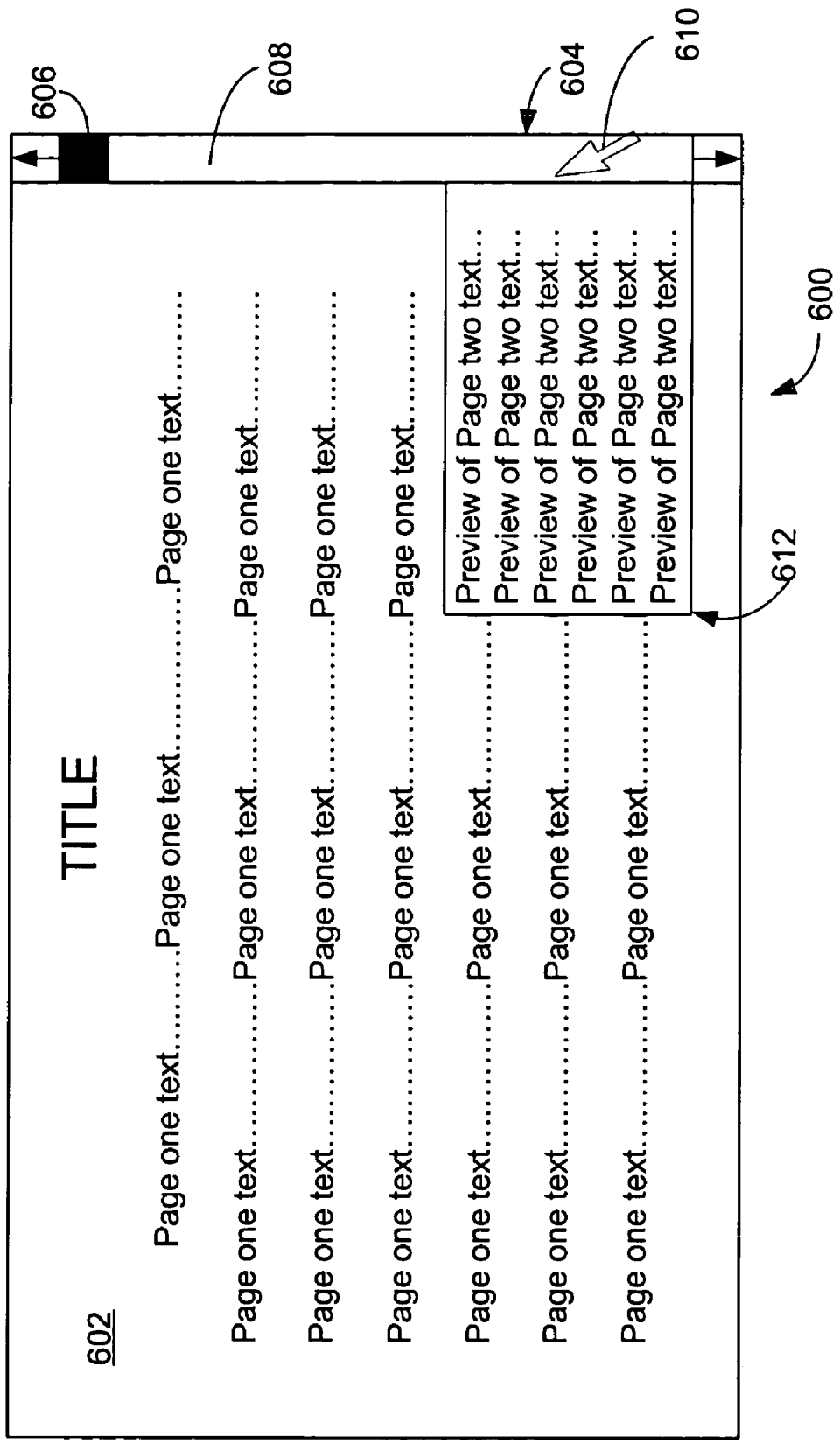

In FIG. 6B, the screen display 600 resulting from receipt of a user input representing a selection to view a preview of a proposed navigational action is shown. In this embodiment, the user input is communicated via user interaction with a mouse that has caused the mouse pointer 610 to be positioned over the scrollbar 604. The proposed navigational action is to navigate to the portion of the document which would be displayed in the screen area 602 if the scroll indicator 606 were moved to the position where the mouse pointer 610 resides. The mouse pointer 610 is positioned over a portion of the scroll column 608 that is associated with the second page of the content displayed in the screen area 602. Hence, a preview of the second page of the document is displayed in the preview display area 612. In one embodiment of the present invention, the mouse must be hovered over the scroll column 608 for a predetermined period of time before the preview display 612 is rendered. Those skilled in the art will recognize that the user input representing a proposed navigational action may be communicated via a variety of input devices and input techniques. For example, the input may also be communicated via a keyboard keystroke combination. One such keystroke combination may be depressing the "Page Down" and "Alt." keys at the same time.

The secondary display area 612 displays a preview of the content associated with performance of the proposed navigational action. The preview content may simply be at least a portion of the content that would be presented following such performance or may be another set of content selected to preview the action. For example, a paginated document may be previewed by displaying a portion of the page that would be displayed as a result of performance of the navigational action or may be previewed more precisely by displaying the content which would be shown in the screen area 602. More sophisticated content selection algorithms may also be employed. For example, only text having certain title or heading properties may be displayed in the preview display. Such content may be pulled from different parts of the document to provide the most useful preview display. As discussed above, those skilled in that art will recognize that any number of content selection algorithms may be utilized with the present invention and the a user may be given the opportunity to control some of the selection choices for each type of item being previewed.

As another example, the proposed navigational action may be to view the contents of a item. The item may be displayed in the screen area 602, and such display may utilize a graphical indicia such as a link, icon or bookmark. A user may communicate a desire to view a preview of the item via an input such as hovering the mouse pointer 610 over the graphical indicia. Such an input would result in the rendering of a preview display upon the screen area 602 containing preview content selected in a manner similar to that described above. For example, the item to be previewed may be a web page. A hyperlink to the web page may be displayed in the screen area 602 within a word processing document. Following a user input, the contents of the web page may be downloaded from the Internet and shown in a preview display. Those skilled in the art will recognize that this preview utility is similar to the utility discussed in relation to FIGS. 2A and 2B and that a variety of file types may be previewed in this manner, regardless what type of content is currently being presented in the screen area.

Figure 6C:
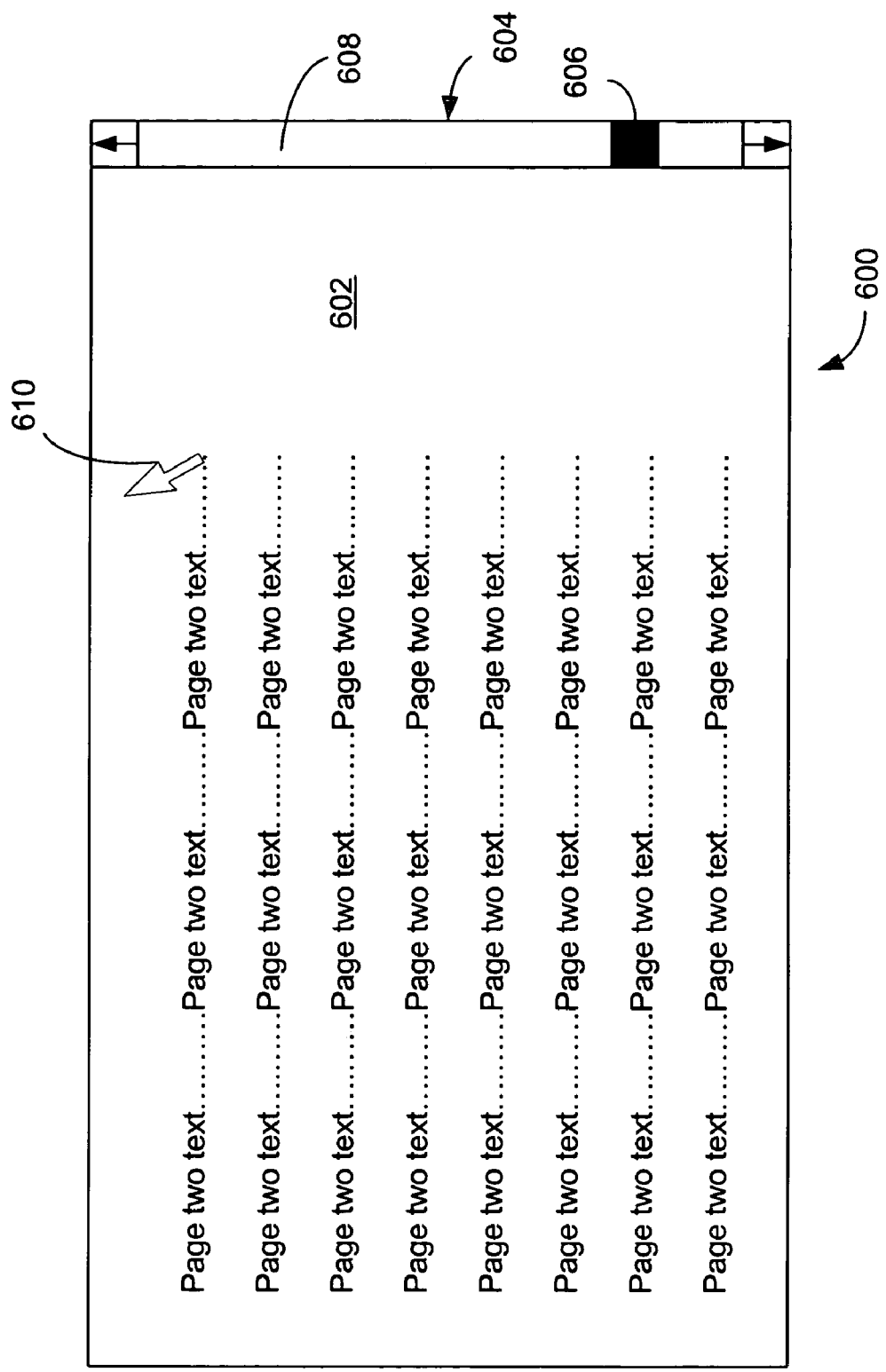

FIG. 6C displays the result of a user's selection to perform the proposed navigational action. The scroll indicator 606 has been moved to the position within the scrollbar 604 associated with the proposed navigational action. The content which had been previewed, page two, is now viewable in the screen area 602, while the preview display is no longer viewable.

Figure 7:
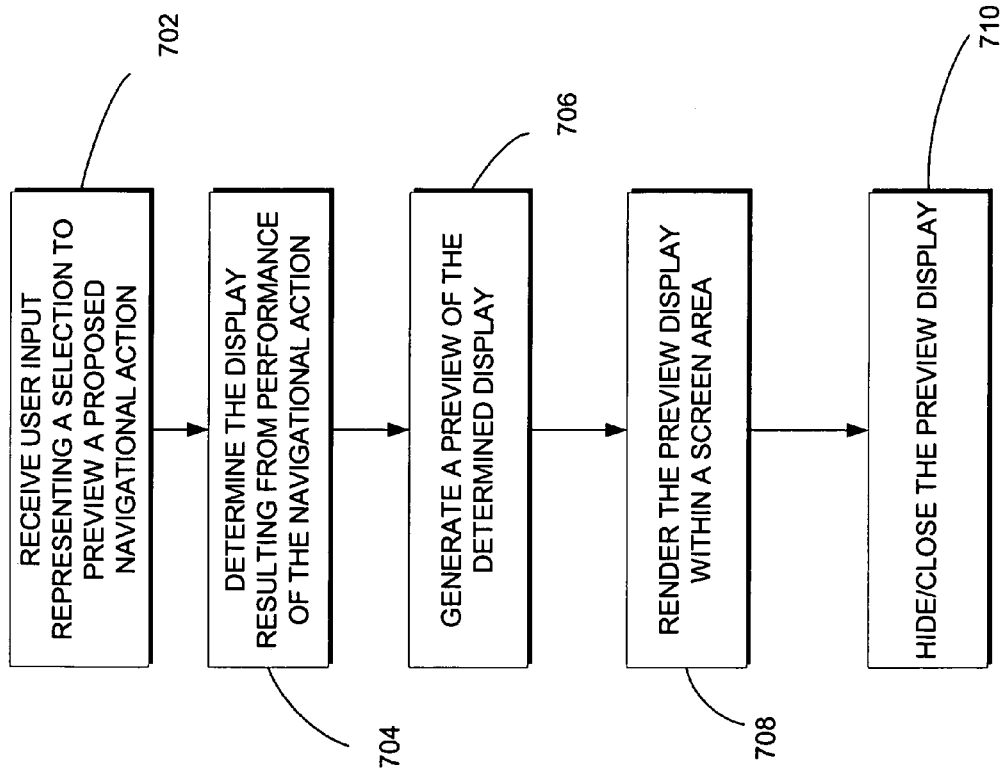
FIG. 7 is a flow diagram showing a method for providing a preview display in accordance with the embodiment of the present invention shown in FIGS. 6A–6C.

Turning to FIG. 7, a flow diagram illustrating a method 700 in accordance with the present invention for providing a preview display is presented. At 702, the method 700 receives a user input representing a selection to preview a proposed navigational action associated with some piece of content. This content may be any media displayable on a computer screen and may be stored in a computer file on a local or a remote computer. The content may be, for example, a word processing document, a presentation document, a spreadsheet or an, email. The user input may be communicated by a variety of input devices and via a variety of input techniques. The proposed navigational action may change the content that is displayed upon a computer screen. For example, if page one of a document is displayed on a computer screen, a user may desire to see a preview of a latter page before committing to that navigation. A user input representing a selection to preview the contents of a latter page may be received at 702.

At 704, the method 700 determines the display resulting from performance of the navigational action. The determined display is the display which would be displayed to the user if the proposed navigational action were performed.

At 706, a preview of the determined display is generated. As discussed above, the content which is selected for the preview display may simply be the display resulting from performance of the proposed navigational action or may be selected according to a more complicated content selection algorithm. This preview content is rendered in a preview display within a screen area at 708.

At 710, an optional step of hiding or closing the preview display is performed. Those skilled in the art will recognize that such hiding may be the result of a subsequent user input indicating a desire for removal of the preview display and that a variety of user inputs are acceptable for such indication. Such a subsequent input may be a request to perform a navigational action or to discontinue the rendering of the preview display. Additionally the preview display may be hidden automatically after a set period of time has elapsed.

Figure 8:
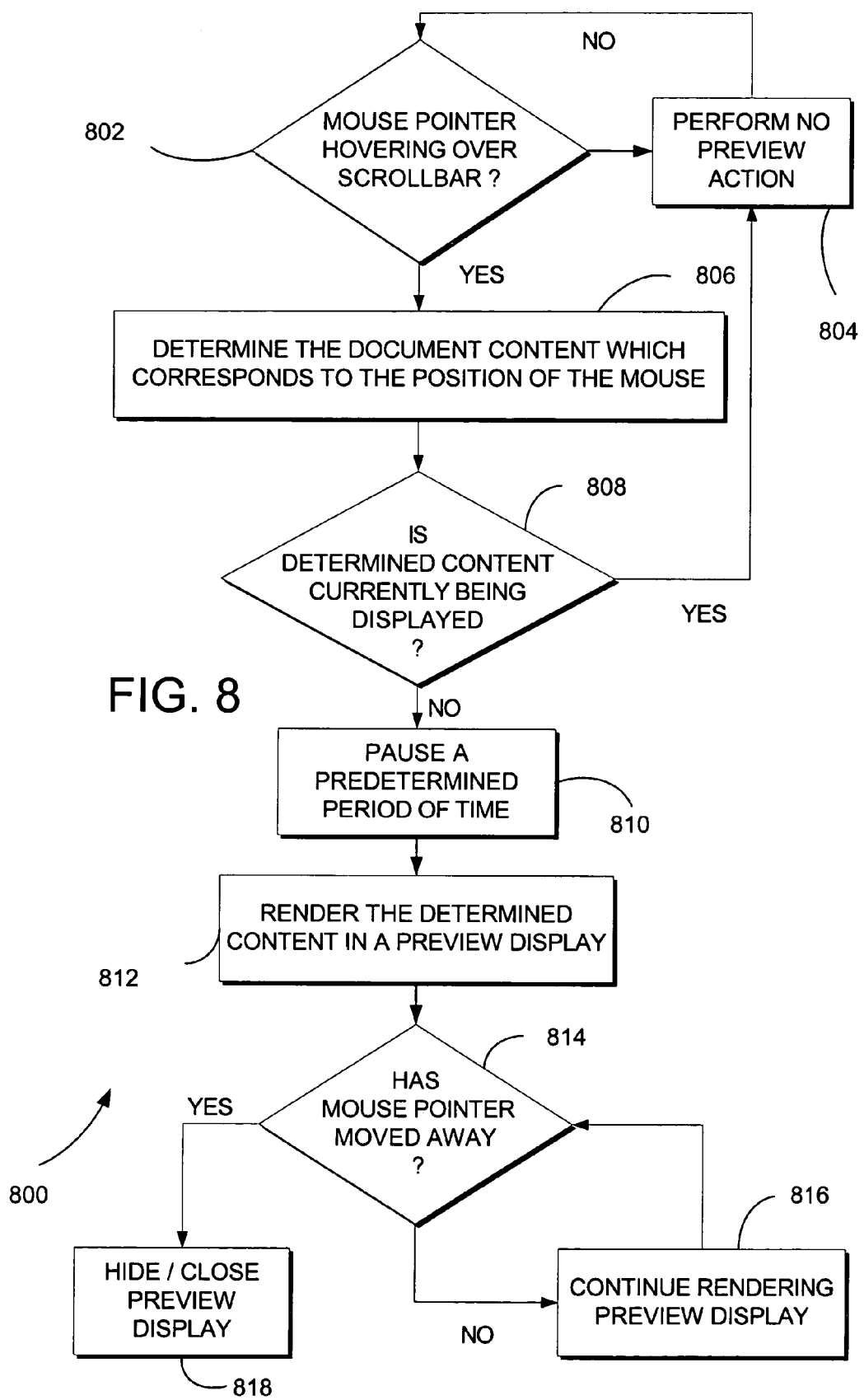
FIG. 8 is a flow diagram showing a method for providing a preview display in accordance with the embodiment of the present invention shown in FIGS. 6A–6C.

FIG. 8 is a flow diagram illustrating another method 800 for providing a preview display in accordance with the present invention. At 802, the method 800 determines whether a mouse pointer is hovering over a scrollbar. If no such hovering is detected, no preview action is performed as indicated at 804. If the mouse is hovering over the scrollbar, at 806, the method 800 determines the document content that corresponds to the position of the mouse pointer. As discussed previously, each position within the scrollbar has corresponding content that would be displayed if the scroll indicator were placed at that position.

At 808, the method 800 determines whether the content corresponding the position of the mouse pointer is currently being displayed to the user. If the content is being displayed, no preview action is performed as indicated at 804. If the content is not being displayed, 812 dictates a pause for a predetermined period of time. This pause is an optional step included to minimize undesired preview displays. Following the pause, at 814, the preview content is rendered in a preview display.

At 816, the method 800 determines whether the mouse position has moved away from the scrollbar or the preview display. If not, at 818, the method 800 continues to render the preview display. If the position has changed, the preview display is hidden at 820.

Figure 9:
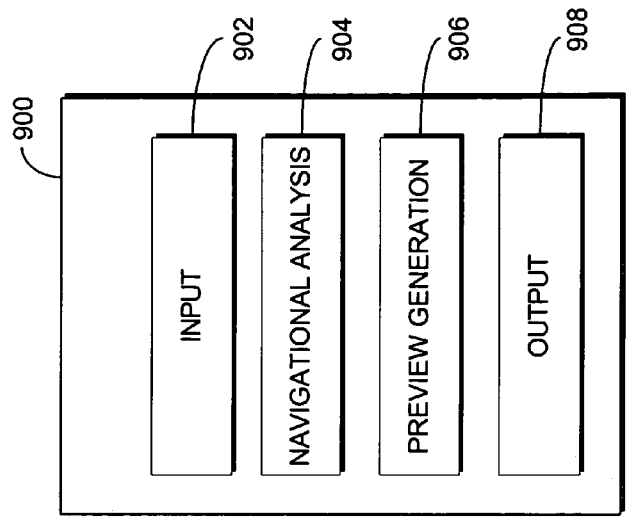
FIG. 9 is a block diagram of a navigation control in accordance with the embodiment of the present invention shown in FIGS. 6A–6C.

In FIG. 9, a block diagram of a navigation control 900 in accordance with the present invention is shown. The navigation control 900 has a user input component 902 for obtaining data indicating an input representing a proposed navigational action to be performed with respect to a set of content. Such input may be via one or more of a variety of input devices.

The navigation control 900 also comprises a navigational analysis component 904. This component is configured to determine the content that would be presented to a user as a result of performance of the proposed navigational action. For example, if a document were displayed to a user and the input component received data indicating a proposed navigational action to scroll down a certain portion of the document, the navigational analysis component would determine the content which would be displayed to the user as a result of such scrolling.

The navigation control 900 further comprises a preview generation component 906 which is configured to select a display associated with the content determined by the navigational analysis component to show in the preview display. Such selection may be to simply display a page of a document or may rely on more complicated content selection rules. For example, the content selection rules may include the functionality to consider characteristics of document text. White space may be disregarded, while text with certain heading properties may be selected. Those skilled in the art will recognize that such functionality is well known in the art and that the result of such content selection may resemble a table of contents.

An output component 908 is also included in the navigation control 900. The output component 908 generates instructions for rendering the selected content within a preview display. Such graphical output components are well known in the art.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A graphical user interface embodied on one or more computer-readable media and executable on a computer, said graphical user interface comprising:
   a primary display area operable to display an item;
   a navigation area configured to accept user inputs relating to navigational actions to be performed with respect to the item; and
   a secondary display area rendered in response to a user input representing a proposed navigational action to be performed with respect to the item, wherein said secondary display region displays a preview that includes actual content from said item which would be displayed in the primary display area if the proposed navigational action were performed, wherein said actual content is selected by utilization of a content selection algorithm that determines which content from said item will be useful to a user in making one or more navigational choices.

2. The user interface of claim 1, wherein said item is a computer file.

3. The user interface of claim 1, wherein said item is a document.

4. The user interface of claim 1, wherein said item is a word processing document, a presentation document, or a spreadsheet.

5. The user interface of claim 1, wherein said item is a webpage.

6. The user interface of claim 1, wherein said primary display area is associated with an application capable of displaying said item within said primary display region.

7. The user interface of claim 1, wherein said navigation area includes a scrollbar including a column bar and an indicator box, and wherein said user input representing a proposed navigational action is associated with a location within the column bar that relates to the proposed navigational action.

8. The user interface of claim 7, wherein said location is communicated via user interaction with a mouse, wherein said mouse includes a pointer viewable in said navigation area and wherein said pointer is positioned at the location for a predetermined time period.

9. The user interface of claim 1, wherein said navigational inputs are communicated via a mouse, a keyboard, and/or a screen with user input capacity.

10. The user interface of claim 1, wherein said proposed navigational action is to navigate to a portion of the item not currently displayed in said primary display area.

11. The user interface of claim 1, wherein said item includes a link associated with a file or object.

12. The user interface of claim 11, wherein said proposed navigational action is to navigate to said file or object associated with the link.

13. The user interface of claim 1, wherein said secondary display area displays a portion of the item which would be viewable in the primary display area if said proposed navigational action were performed.

14. The user interface of claim 1, wherein said secondary display area is hidden in response to a user input subsequent to said user input representing a proposed navigational action.

15. A computerized method for navigating content presented in a graphical user interface, said method comprising:
   displaying a first view of an item in a primary display area;
   receiving a user input representing a proposed navigational action to be performed with respect to said item;
   generating a second view of said item, wherein said second view includes actual content from said item that would be displayed in the primary display area if said proposed navigational action were performed, wherein said actual content is selected by utilization of a content selection algorithm that determines which content from said item will be useful to a user in making one or more navigational choices; and
   rendering a secondary display area in response to said user input, wherein said secondary display area displays at least a portion of said second view of said item.

16. The computer-implemented method of claim 15, wherein said item is a computer file.

17. The computer-implemented method of claim 15, wherein said item is a document.

18. The computer-implemented method of claim 15, wherein said item is a word processing document, a presentation document, a spreadsheet or a web page.

19. The computer-implemented method of claim 15, wherein said item includes a link associated with a computer file or object, or an icon associated with a computer file or object.

20. The computer-implemented method of claim 15, wherein said primary display area is associated with an application capable of displaying said item within said primary display region.

21. The computer-implemented method of claim 15, wherein said navigational inputs are communicated via a mouse, a keyboard, and/or a screen with user input capacity.

22. The computer-implemented method of claim 15, wherein said proposed navigational action is to navigate to a portion of the item not currently displayed in said primary display area.

23. The computer-implemented method of claim 15, wherein said proposed navigational action is to view the contents of a file or object.

24. The computer-implemented method of claim 23, wherein said file is associated with a link or an icon displayed in said primary display area.

25. The computer-implemented method of claim 15, wherein said secondary display area displays a portion of the item which would be viewable in the primary display area if said proposed navigational action were performed.

26. The computer-implemented method of claim 25, wherein said proposed navigational action is to navigate to said portion.

27. The computer-implemented method of claim 15, wherein said method further comprises:
   receiving a user selection to perform said navigational action with respect to said item; and
   performing said navigational action with respect to said item.

28. The computer-implemented method of claim 27, wherein said performance causes at least a portion of said item to be viewable in the primary display region.

29. The computer-implemented method of claim 27, wherein said performance causes at least a portion of the content displayed in the secondary display area to be viewable in the primary display area.

30. The computer-implemented method of claim 15, wherein said method further comprises hiding said secondary display region in response to receiving a user input subsequent to said user input representing a proposed navigational action.

31. A navigation control for navigating content presented in a graphical user interface, said navigation control comprising:
   a user input component for obtaining data indicative of a proposed navigational action;
   a navigational analysis component for generating a screen display, wherein said screen display includes actual content from said item that would be displayed to a user as a result of a selection to perform the proposed navigational action, wherein said actual content is selected by utilization of a content selection algorithm that determines which content from said item will be useful to a user in making one or more navigational choices;
   a preview generation component for generating a preview image including at least a portion of said screen display; and
   an output component for generating instructions for rendering said preview image on a screen area.

32. The navigation control of claim 31, wherein said preview generation component determines which portion of said set of data being previewed to present in the preview image.

33. The navigation control of claim 31, wherein said preview image includes content which is not currently displayed in the primary display area but which would be displayed in the primary display area if the proposed navigational action were performed.

34. A navigation control for navigating content presented in a graphical user interface, said navigation control comprising:
   means for obtaining data indicative of a proposed navigational action;
   means for generating a screen display, wherein said screen display includes actual content from said item that would be displayed to a user as a result of a selection to perform the proposed navigational action, wherein said actual content is selected by utilization of a content selection algorithm that determines which content from said item will be useful to a user in making one or more navigational choices;
   means for generating a preview image including at least a portion of said screen display; and
   means for generating instructions for rendering said preview image on a screen area.

* * * * *